Patented Jan. 5, 1932

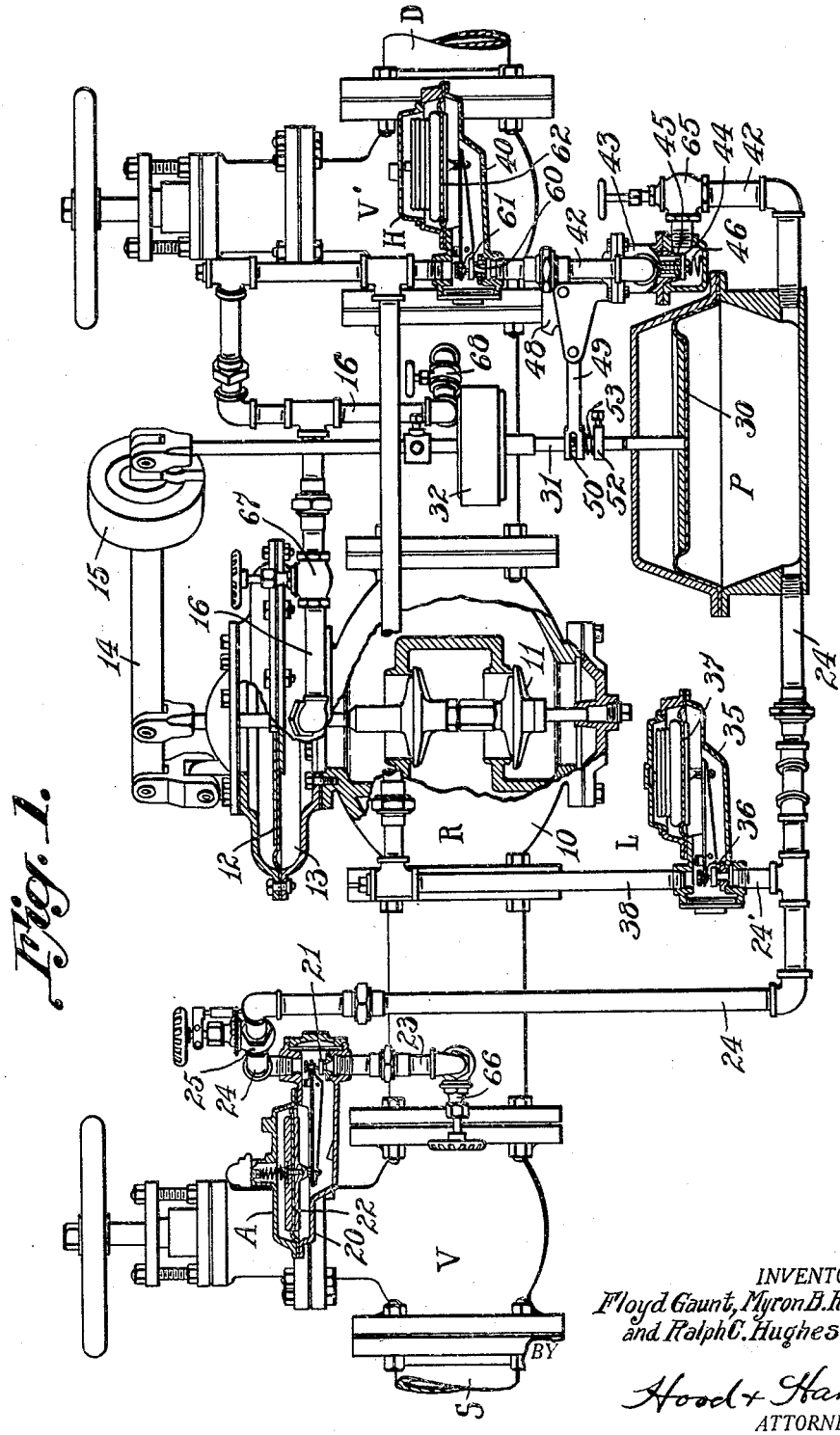

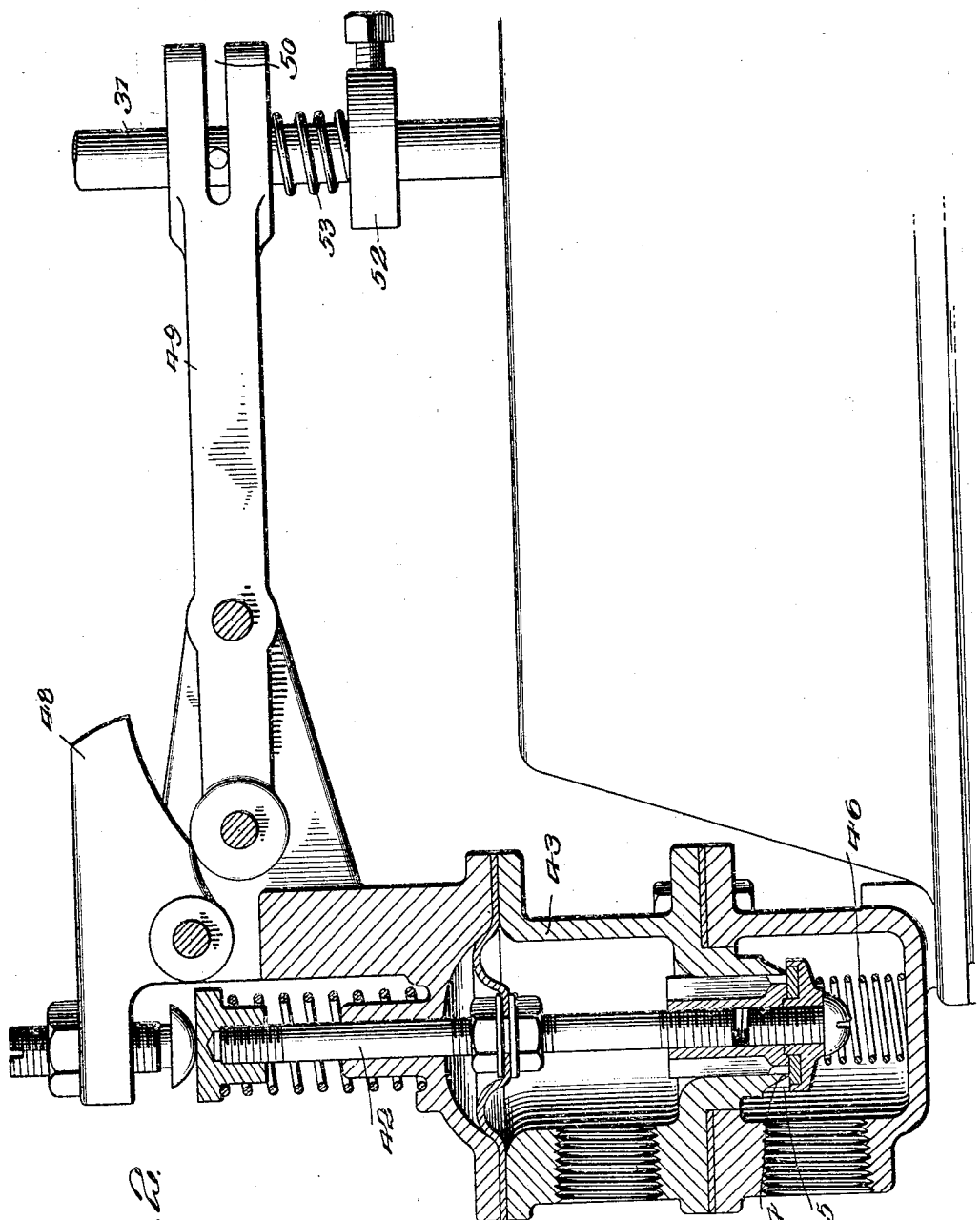

1,839,547

UNITED STATES PATENT OFFICE

FLOYD GAUNT, MYRON B. REYNOLDS, AND RALPH C. HUGHES, OF ANDERSON, INDIANA, ASSIGNORS TO REYNOLDS GAS REGULATOR COMPANY

AUTOMATIC LOADING GAS REGULATOR

Application filed July 27, 1928. Serial No. 295,645.

In the distribution of gas (or other fluids) it is customary to provide a main supply maintained at an adequate pressure to supply maximum demand in the entire system and to divide the system into sections each receiving its supply from the main high-pressure line through a pressure reducing valve adjusted to maintain a reduced pressure in the section presumably sufficient to supply ordinary demand in the section. If, however, a somewhat general condition approaching maximum demand throughout a major portion of the system occurs at any time it is not possible to maintain adequate pressures in distant portions of sections of the system which are demanding large volumes, and it has been necessary, heretofore, to care for such large demand periods by manual adjustments of the pressure-reducing valves.

The object of our invention is to produce an assemblage of mechanisms which will coact automatically to maintain a low maximum pressure in a controlled distribution section so long as the demand in that section is below a predetermined amount, which will coact automatically to maintain a higher maximum pressure in the controlled portion of the system whenever the demand upon that section reaches or exceeds said predetermined amount; and which will coact to automatically restore and maintain the lower maximum pressure when the demand falls below the predetermined volume.

To this end the apparatus comprises two pressure-reducing mechanisms (which may conveniently be designated respectively the low-demand pressure regulator and the high-demand pressure regulator) which are so connected to the system as to be each capable of assuming command of the main valve between supply and demand whenever corresponding demand conditions occur in the controlled delivering portion of the systems.

Referring to the accompanying drawings,

Figure 1 is a diagram, in partial vertical section, illustrating our invention, and Figure 2 is a detail sectional view of a high-demand control valve and connections therewith.

In the drawings S indicates the main supply pipe connected to a high pressure supply, and D the delivery pipe leading to the controlled delivery portion of the distribution system. Between S and D are the main regulator R and two valves V and V' at opposite sides of the regulator R. These valves V and V' are not essential to our invention but are provided to facilitate inspection and repair of regulator R and the controlling mechanisms to be described.

Regulator R is of common form and comprises a valve casing 10 containing a main valve 11 between its inlet and outlet. Valve 11 is controlled by a diaphragm 12 in chamber 13 and the diaphragm is weighted, in the usual manner by lever 14 and adjustable weight 15.

The portion of chamber 13 beneath diaphragm 12 is connected by a pipe 16 with delivery pipe D, preferably between the casing 10 of regulator R and valve V'.

Pressure in the supply line S will ordinarily be much higher than any pressure to be attained in pipe D. We, therefore, provide an auxiliary pressure regulator A which comprises a casing 20 in which is mounted a valve 21 and a diaphragm 22 the position of which controls valve 21. The inlet side of regulator A is connected by pipe 23 to the supply line S, conveniently between regulator R and valve V, and the outlet of casing 20 delivers to a pipe line 24 in which is placed a throttle valve 25, preferably of the needle type so that the rate of flow through pipe line 24 may be accurately adjusted. Diaphragm 22 is so weighted, in the usual manner, as to close valve 21 whenever the pressure in line 24 between casing 20 and valve 25 reaches a predetermined maximum.

Weight 15 is so placed on lever 14 that diaphragm 12 is unable by itself to close valve 11 when the low-demand regulator (to be described) is in command and in order to provide auxiliary power to supplement diaphragm 12 we provide a power bowl P within which is mounted a diaphragm 30 and we connect the delivery end of pipe line 24 to this bowl beneath diaphragm 30. Resting upon diaphragm 30 is a rod 31 which is telescopic, so as to be adjustable in length, and the upper end of this rod is pivotally connected to lever 14. A weight 32 on rod 31 supplements weight 15. Diaphragms 12 and 30 are thus connected in tandem upon the main valve 11.

The delivery end of pipe line 24 is branched at 24' and led to the casing 35 of the low-demand regulator L. Mounted in casing 35 is a valve 36 which controls the delivery end of branch 24' and this valve is actuated by a weighted diaphragm 37. Leading from casing 35 is a pipe 38, which connects with pipe 16 and with casing 40 of the high-demand regulator H. Casing 40 is also connected by a pipe 42 with bowl P beneath diaphragm 30 and in this pipe 42 is a valve 43 which controls communication between casing 40 and bowl P.

Valve 43 comprises a valve head 44 which cooperates with a seat 45 and this head is biased to closing position by a spring 46. Acting upon the stem of head 44 in valve-opening direction is a lever 48 which, in turn, is acted upon by a lever 49 connected by a pin-and-slot connection 50 with rod 31. A collar 52 on rod 31 beneath lever 49 serves as an abutment for a spring 53 which engages lever 49 so as to hold the pin-and-slot connection 50 tight so that upward movement of diaphragm 30 or downward movement of diaphragm 12 will produce quick response of lever 49.

Mounted within casing 40, at the upper end of pipe 42 is a valve seat 60 upon which may seat a valve 61 actuated by a weighted diaphragm 62.

Diaphragm 37 is weighted appropriately for maintaining low-demand maximum pressure in delivery pipe D and diaphragm 62 is weighted appropriately for maintaining high-demand maximum pressure in delivery pipe D.

A valve 65 is placed in pipe 42 between valve 43 and bowl P so that the high-demand regulator may be cut out if desired. A valve 66 is placed in pipe 23 between supply S and regulator A, and two valves 67 and 68 are placed in pipe 16, as shown, to facilitate inspection of various parts of the apparatus.

The operation is as follows:

Assuming all demand to have ceased, accumulation of pressures in casings 13, 20, 37, 40 and bowl P will cause closing of all of the valves 11, 21, 36, 43 and 61.

Opening of any outlet from pipe D will cause a drop in pressure in the chambers below the diaphragms 12, 22, 37, 30 and 62. If the demand is only a small one, valves 21 and 36 will be opened enough to supply the demand, the gas by-passing around valve 11 through the connections 23, 20, 24, (through 25) 24', 35, 38 and 16, and regulator L will act to prevent accumulation of any pressure in pipe D greater than that desired for low-demand. As the low-demand increases the pressure beneath diaphragms 12 and 30 will drop, so that valve 11 will open and permit a supply for the increased demand to flow through regulator R; but the pressure in the pipe D will not rise above the desired low-demand maximum, because any tendency in this direction causes a backpressure in regulator L, through pipe 38, operating to close valve 36. The closing of this valve decreases the rate of flow from pipe line 24 and permits pressure to accumulate, at a rate controlled by the adjustment of valve 25, in bowl P, so as to act on diaphragm 30, to supplement the power of diaphragm 12, and thus move valve 11 toward closing position, and thus cut down the rate of flow to the delivery line D.

During this operation of low-demand, valve 60 also opens but has no effect because diaphragms 12 and 30 do not descend far enough to bring lever 49 into engagement with lever 48, and consequently valve 43 is not opened. This is due to the fact that the ratio of the rate of flow from supply line S to the rate of flow through throttle valve 25 is not great enough to permit sufficient reduction of pressure beneath diaphragm 30.

If, however, enough opening be made in delivery line D to produce the predetermined high demand, the rate of flow through valve 25 will not be great enough to keep diaphragm 30 high enough to hold lever 49 away from lever 48, so that valve 43 is opened. The pressure in the delivery side of the system now increases and backs up under diaphragm 37, thus relieving regulator L from command, and putting regulator H in command so that, during continued high demand, regulator H will operate to maintain the high-demand maximum pressure in delivery line D.

As soon as demand drops below the predetermined amount pressure will accumulate in regulator H so as to close valve 61 and this will permit accumulation of pressure beneath diaphragm 30, valve 43 will be closed and regulator L will resume command.

The action is entirely automatic and wholly dependent on the rate of outflow from delivery line D.

We claim as our invention:

1. A fluid pressure regulator system comprising a main valve arranged between supply and demand, two pressure-affected elements acting in tandem upon said main valve to position it according to demand, a low-demand pressure-affected pressure-reducing element having arranged delivery pipe leading to the controlled delivery portion of the distribution system to be affected by pressure conditions in one of said tandem elements to maintain low-demand maximum pressure in the delivery line during low demand, a high-demand pressure-affected pressure reducing element arranged to be affected by pressure conditions in the other of said tandem elements to maintain high-demand maximum pressure in the delivery line, and means actuated by said tandem elements to connect or disconnect the high-demand regulator with the first mentioned one of the tandem elements.

2. A fluid pressure regulator as defined in claim 1 comprising a third pressure-affected pressure-reducing element, a connection between the main supply and said third element, and a connection between the low pressure side of said third element and the low-demand regulator and the first mentioned tandem element.

3. A fluid-pressure regulating means comprising a main valve arranged between supply and demand, a main pressure-affected regulator connected to said main valve, an auxiliary pressure-affected regulator connected in tandem with the main regulator upon said main valve, a pressure-affected low-demand pressure regulator, a pressure-affected high-demand pressure controller, a throttled connection between supply and the inlet to the pressure-chamber of the low-demand regulator and to the pressure chamber of the auxiliary tandem controller, a connection between the pressure chambers of the main regulator, low-demand regulator, high-demand regulator and the delivery side of the main valve, a connection between the pressure chamber of the auxiliary tandem regulator and the valved side of the pressure chamber of the high-demand regulator, a valve in said last-mentioned connection, and means actuated by the tandem controllers to actuate said last mentioned valve.

4. A fluid pressure regulator system comprising a main valve arranged between supply and demand, two pressure-affected elements acting in tandem upon said main valve to position it according to demand, a low-demand pressure-affected pressure-reducing element arranged to be affected by pressure conditions in one of said tandem elements to maintain low-demand maximum pressure in the delivery line during low demand, and a high-demand pressure-affected pressure reducing element arranged to be affected by pressure conditions in the other of said tandem elements, to maintain high-demand maximum pressure in the delivery line.

In witness whereof, we, FLOYD GAUNT, MYRON B. REYNOLDS, and RALPH C. HUGHES, have hereunto set our hands at Anderson, Indiana, this 21st day of July, A. D. one thousand nine hundred and twenty eight.

FLOYD GAUNT.
MYRON B. REYNOLDS.
RALPH C. HUGHES.